June 6, 1944. F. E. BURGESS 2,350,444
TREAD UNIT FOR ENDLESS TRACKS
Filed April 30, 1942 2 Sheets-Sheet 1

Witness:
Chas. R. Koursh

INVENTOR.
Frank E. Burgess,
BY Offield Mehlhope Scott & Poole
Attys

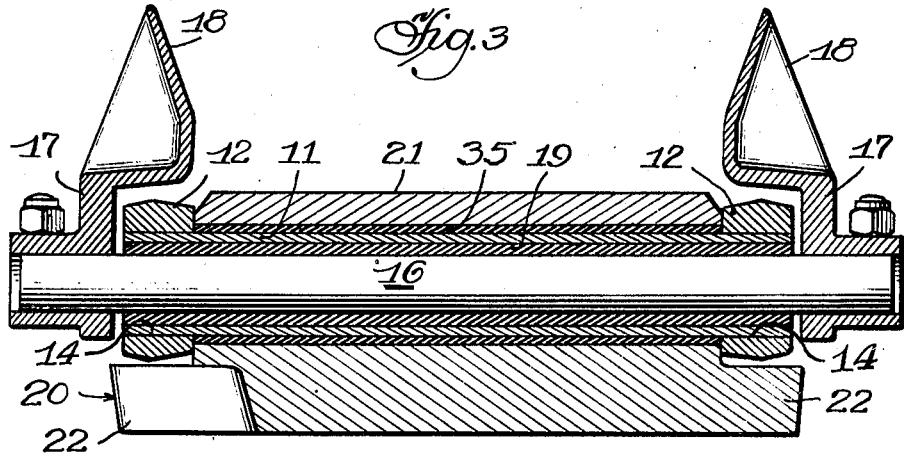
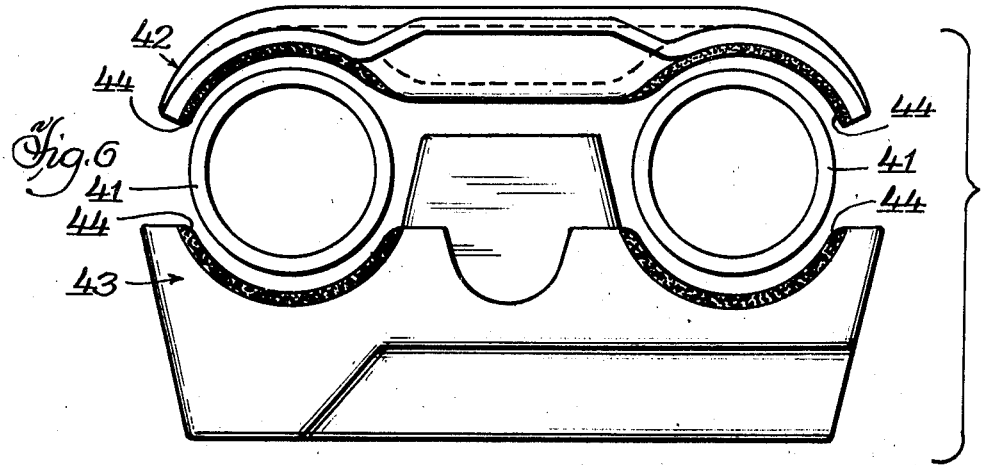
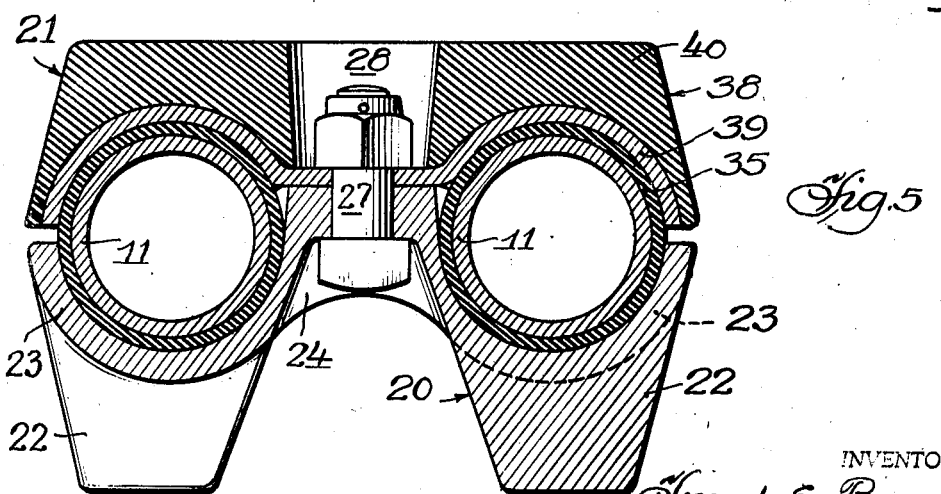

Patented June 6, 1944

2,350,444

UNITED STATES PATENT OFFICE 2,350,444

TREAD UNIT FOR ENDLESS TRACKS

Frank E. Burgess, Geneva, Ill., assignor to Burgess - Norton Manufacturing Company, Geneva, Ill., a corporation of Illinois Application April 30, 1942, Serial No. 441,107

5 Claims. (Cl. 305—10)

This invention relates to improvements in endless track construction, and more particularly to an improved construction for the tread units that make up the endless tracks of a tank or like vehicles.

More specifically, the present invention relates to an improvement in the type of tread units broadly disclosed in my prior application bearing Serial No. 435,207, filed March 18, 1942, wherein the several tread members consist of a rigid metallic link including two spaced parallel pivot sleeves connected together at opposite ends, together with a detachable tread block made up of upper and lower plate members clamped to said pivot members. Such detachable tread block members are designed to be substituted, or used as replacements for a certain form of molded rubber tread block which has heretofore been utilized in standard endless track construction for army tanks.

One of the difficulties encountered with such detachable tread block devices is that of insuring a tight fitting engagement of the detachable tread block members, especially where small variations may occur in the associated parts, as for instance by distortion or stretching of the metallic link member which often takes place while in service, or by injury or warping of the detachable plates. In such cases the plates may not fit properly on the metallic link, and therefore tend to become loosened and cause clattering and noise while in operation.

In carrying out the present invention, I provide an improved construction wherein a sleeve or strip of resilient material, preferably rubber, is interposed between the tread block plates and the pivot bars of the links, so as to provide a much more satisfactory tread structure overcoming the difficulties above mentioned.

As a further advantage, the sleeve or strip of resilient material affords a snubbing or shock-absorbing means to relieve unusual stresses between the detachable tread blocks and their supporting links.

The invention may best be understood by reference to the accompanying drawings wherein certain preferred embodiments thereof are shown, as follows:

Figure 3 is a longitudinal section taken along one of the pivotal axes of the tread unit.

Figure 5 is a view iln longitudinal section through a modified form of tread unit, in which the upper clamping member has a rubber-covered upper surface.

Figure 6 is an expanded end view of another modified form of tread unit, in which rubber sheet inserts are mounted on the clamping members instead of on the pivot bars.

Figure 1:
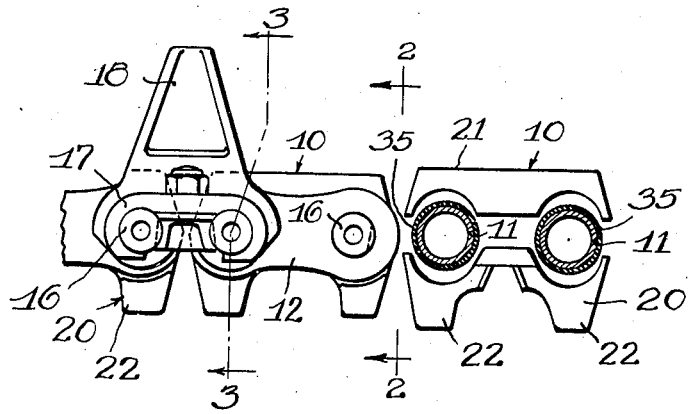
Figure 1 is a view in side elevation of several tread units with certain parts broken away to show details thereof.
Figure 2:
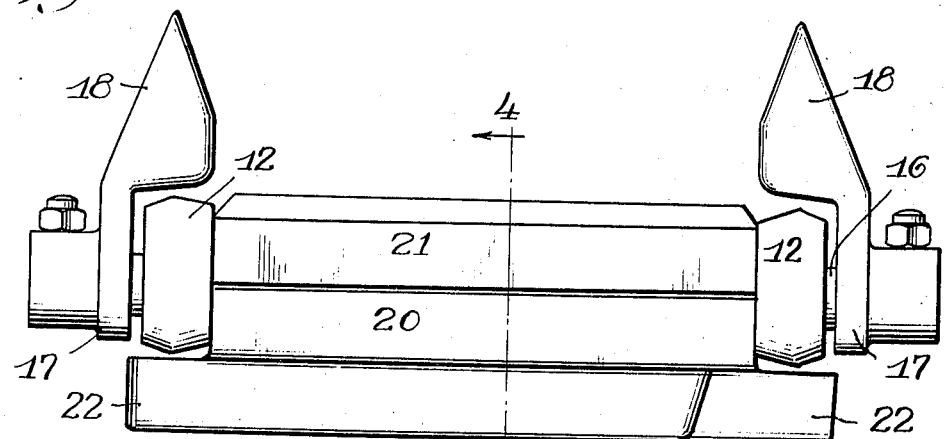
Figure 2 is an enlarged view in end elevation of a single tread block.
Figure 4:
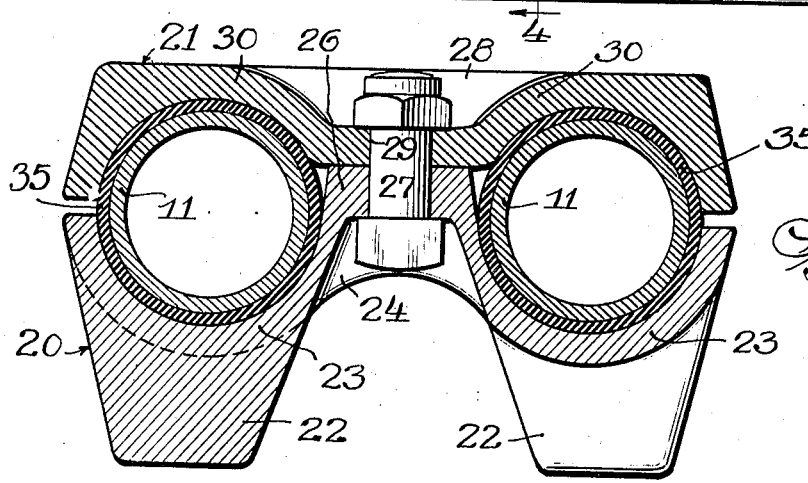
Figure 4 is an enlarged transverse section taken on line 4—4 of Figure 2.

Referring now to details of the invention illustrated in the drawings, the form of tread unit indicated at 10 in Figures 1 to 4 consists of a pair of parallel tubular steel pivot sleeves or members 11, 11 extending transversely of the track proper, and rigidly connected at opposite ends by bars 12, 12. Each of said bars has eyes 14, 14 at opposite ends within which the ends of the pivot members 11 are secured as by brazing or welding. The pivot sleeves 11, 11 and end bars 12, 12 thus form a rigid open rectangular link member.

Each tread unit is pivotally linked to similar adjacent units by means of pivot pins 16, 16 extending through the tubular pivot sleeves 11, and having relatively short C-shaped connectors 17, 17 suitably secured at opposite ends thereof so that said connectors join adjacent tread blocks in relatively short-coupled relation, as shown in Figure 1. The pivot pins 16 and connectors 17 shown herein are of well known construction, and form no part of the present invention, so need not be described in detail excepting to mention that a sleeve 19, of resilient material, preferably rubber, may be interposed between each of the pivot pins and its surrounding sleeve 11, and affords sufficient turning movement between each pivot pin and tread member to provide the required flexibility of the endless track. Also, each of the connectors 17 has a tapered finger 18 projecting upwardly therefrom so as to form part of a guideway along opposite sides of the upper track surface, for engagement with suitable track guiding means such as the bogie wheels on the tank body.

It will now be understood that the rectangular links, consisting of tubular sleeves 11 and end bars 12, together with the pivot pins 16 and connectors 17, which join said rectangular links together, form the foundation of the track structure which carries the tractive effort of the endless chain.

The detachable tread members which are connected to each of the rectangular links to complete the tread of the track structure, consist of a bottom traction shoe 20 and an upper clamping plate 21, which fit over and are clamped to each pair of opposed sleeves 11, 11. The traction shoe is essentially a rectangular steel plate provided with a suitable arrangement of traction lugs 22, 22 on its bottom, and with a pair of half-round channels 23, 23 extending lengthwise on either side of its center line, the latter being marked by a ridge 24 along which are three equally spaced bolt holes formed in cylindrically upset bosses 26, thus leaving a space below to accommodate the heads or nuts of bolts 27, which are used to draw and hold the bottom shoe and its clamping plate together.

The top member or clamping plate 21 is also rectangular in shape, and in the form shown in Figures 1 to 4, is made of metal substantially flat along its upper face excepting for a plurality of recesses 28 along its center line registering with the bosses 26 of the bottom shoe, and having bolt holes 29 therethrough for receiving the nuts or heads of the clamping bolts 27. The under face of the clamping plate has a pair of part-round channels 30 registering and cooperating with the channels 23 on the bottom shoe to fit around the pivot sleeves 11, 11 of the link member.

Referring now to the means for resiliently mounting the tread members on the link members, which constitutes the principal feature of the present invention, I provide each of the sleeves 11 with a resilient sleeve 35 of substantial thickness, preferably of rubber, vulcanized to the surface of said sleeve throughout its length, so as to form a resilient surface against which the clamping plates 20 and 21 may be engaged and drawn together under yielding tension by the clamping action of bolts 27.

With this improved feature, it will be understood that the sleeves 35 will readily accommodate themselves to the part-rounded channels of the upper and lower plates 20 and 21 regardless of minor variations in the shape of the cooperating surfaces of the channels and pivot links. Moreover, it is unnecessary to rely upon the springing or bending of the top plate under clamping tension to insure a tight fit, as has been the case with previous designs wherein the clamping plates directly engage the sleeves 11 with a metal-to-metal contact.

Figure 5 illustrates a modified form of tread block wherein the upper clamping plate 38 is of composite construction, namely, a metal base plate 39 and a rubber outer facing 40 vulcanized to said base plate. This form of tread block may be preferred under certain conditions, as for instance when the bogie wheels of the tank have a rubber rim, and a rubber-to-rubber contact is desired. In other respects, particularly that of the provision of rubber sleeves 35, 35 between the clamping plates and the pivot sleeves 11, 11, the structure of Figure 5 is similar to that heretofore described in connection with Figures 1 to 4.

In the modified form of the invention shown in Figure 6, the resilient means interposed between the metal sleeves 41 of the rectangular link, and the channeled engaging portions of the top and bottom clamping plates 42 and 43, consist of rubber sheets 44 vulcanized along the channeled surfaces of said clamping plates, as shown.

Although I have shown and described certain embodiments of my invention, it will be understood that I do not wish to be limited to the exact construction shown and described, but that various changes and modifications may be made without departing from the spirit and scope of my invention as defined in the appended claims.

I claim as my invention:

1. In an endless track construction, a tread unit consisting of a pair of tubular pivot bearing members having end members rigidly connecting them together, a tread block comprising separable plate members, means for clamping said plate members to said pivot bearing members, and resilient sheet material interposed between said tread block members and said pivot bearing members and compressible under the action of said clamping means.

2. In an endless track construction, an endless chain made up of a plurality of tread units, each comprising a pair of spaced metallic tubular pivot bearing members and links connecting said pivot bearing members together at opposite ends to form a rigid open frame, and other links at the ends of said pivot bearing members connecting them to similar pivot bearing members of adjacent tread units, so that said tread units and the said other links carry the tractive effort of said chain, a rubber sleeve surrounding each of said pivot bearing members, and tread-forming means spanning each pair of said pivot bearing members above and below the latter in direct engagement with said sleeves.

3. In an endless track construction, an endless chain made up of a plurality of tread units, each comprising a pair of spaced metallic tubular pivot bearing members and links connecting said pivot bearing members together at opposite ends to form a rigid open frame, and other links at the ends of said pivot bearing members connecting them to similar pivot bearing members of adjacent tread units, so that said tread units and the said other links carry the tractive effort of said chain, a rubber sleeve surrounding each of said pivot bearing members and vulcanized thereto, and tread-forming means spanning each pair of said pivot bearing members above and below the latter in direct supporting engagement with said rubber sleeves.

4. In an endless track construction, an endless chain made up of a plurality of tread units, each comprising a pair of spaced metallic tubular pivot bearing members and links connecting said pivot bearing members together at opposite ends to form a rigid open frame, and other links at the ends of said pivot bearing members connecting them to similar pivot bearing members of adjacent tread units, so that said tread units and the said other links carry the tractive effort of said chain, a rubber sleeve surrounding each of said pivot bearing members, and tread-forming means consisting of a shoe and a face plate clamped together on opposite sides of each pair of pivot bearing members in direct engagement with said sleeves, and removable therefrom without disturbing the said links and their tractive connections.

5. In an endless track construction, an endless chain made up of a plurality of tread units, each comprising a pair of spaced parallel metallic tubular pivot bearing members and links connecting said pivot bearing members together at opposite ends to form a rigid open frame, and other links at the ends of said pivot bearing members connecting them to similar pivot bearing members of adjacent tread units, so that said tread units and the said other links carry the tractive effort of said chain, a sleeve of resilient material surrounding each of said pivot bearing members, and tread-forming means comprising a shoe and a face plate detachably engageable with each pair of pivot bearing members on opposite sides thereof in direct supporting engagement above and below said sleeves.

FRANK E. BURGESS.